United States Patent [19]

Huber

[11] Patent Number: 4,845,396

[45] Date of Patent: Jul. 4, 1989

[54] MOTOR BRUSH HOLDER ASSEMBLY

[75] Inventor: Duane J. Huber, Bartlett, Ill.

[73] Assignee: Capsonic Group, Inc., Elgin, Ill.

[21] Appl. No.: 120,739

[22] Filed: Nov. 10, 1987

Related U.S. Application Data

[63] Continuation of Ser. No. 897,825, Aug. 19, 1986, abandoned.

[51] Int. Cl.$^4$ .............................................. H02K 13/00
[52] U.S. Cl. ...................................... 310/239; 310/43;
310/68 R; 310/71; 310/DIG. 6
[58] Field of Search ............... 310/239, 241, 242, 245,
310/247, 42, 43, 47, 50, 68 R, 71, 89, 90, DIG.
6; 19/597; 264/272.19, 272.2

[56] References Cited

U.S. PATENT DOCUMENTS

| | | | |
|---|---|---|---|
| 3,225,232 | 12/1965 | Turley | 310/50 |
| 3,604,960 | 9/1971 | Krestel | 310/50 |
| 3,924,147 | 12/1975 | Tarnow | 310/239 |
| 4,090,098 | 5/1978 | Kranzler | 310/50 |
| 4,355,253 | 10/1982 | Vollbrecht | 310/239 |
| 4,370,579 | 1/1983 | Kobayashi | 310/71 |
| 4,546,280 | 10/1985 | Pfluger | 310/71 |
| 4,585,964 | 4/1986 | Hildebrandt | 310/42 |
| 4,613,781 | 9/1986 | Sanders | 310/71 |
| 4,673,837 | 6/1987 | Gingerich | 310/42 |
| 4,705,983 | 11/1987 | Franz | 310/239 |

Primary Examiner—R. Skudy

[57] ABSTRACT

A brush holder assembly for an electric motor and a method of making it. The assembly comprises a unitary structure formed of a molded plastic housing in which a stamped and formed metal circuit plate is encapsulated. Separate circuit strips are formed by punching circuit bridges out of the plate after it is encapsulated. The separate circuit strips are embedded in one face of a web spanning the housing. On the opposite face of the web, brush holder channels are molded. The separate circuit strips each have a terminal formed unitarily with them, the terminals being embedded in a socket extending radially, outward from the web through a skirt encircling the web.

3 Claims, 3 Drawing Sheets

MOTOR BRUSH HOLDER ASSEMBLY

This application is a continuation of application Ser. No. 897,825 filed 8/19/86, now abandoned.

FIELD OF THE INVENTION

This invention is in the field of electric motor construction. It relates particularly to the construction and method of manufacture of a commutator brush holder or mounting assembly for an electric motor.

BACKGROUND OF THE INVENTION

An electric motor includes an armature system fixed to a shaft for rotation with the shaft. Also mounted on the shaft is a commutator. The commutator is contacted, around its periphery, by a plurality of commutator brushes which, through circuitry to which they are connected, effect a periodic reversal of current flow into the armature system as it rotates.

The commutator brushes are mounted in a commutator brush holder assembly. The commutator brush holder assembly includes a brush holder housing which forms one end of the housing for the motor itself. The brush holder housing contains the circuitry through which an external power source is connected to the armature system, through the brushes, and to a stator coil through fixed terminals. The brush holder housing also contains mounting structure for the brushes.

A conventional commutator brush holder assembly comprises more than twenty components which must be laboriously assembled, to a large extent by hand. In one well known assembly, the process involves four barrel terminals being crimped to four sections of connector wire. Two of the connector wires are then crimped to double "D" terminals. Six additional wire sections are next crimped to two double, double "D" terminals. Four brush holder clips are subsequently connected to four of the wires which are connected to the double, double "D" terminals, and bent to form receptacles for the brushes. The four barrel terminals are finally inserted into an external connector. Finally, the entire terminal, wire, brush holder clip, and connector sub-assembly is stuffed into a housing which has been molded separately of dielectric material.

SUMMARY OF THE INVENTION

A primary object of the present invention is to provide an improved brush holder assembly for an electric motor.

Another object is to provide a brush holder assembly which is simpler and less expensive to manufacture than conventional brush holder assemblies.

Still another object is to provide a brush holder assembly comprising only two components prior to manufacture.

A further object is to provide a brush holder assembly wherein the circuitry is encapsulated in a molded, brush holder housing.

Another object is to provide a new and improved method of manufacturing a brush holder assembly.

The foregoing and other objects are realized in accord with the present invention by fabricating a brush holder assembly from only two major components, a stamped and formed circuit plate, and a molded plastic body. The circuit plate is fabricated from a thin sheet of conductive metal. It is stamped into circuit strips and barrel terminal blanks. The barrel terminal blanks are formed into barrel terminals by forming means which also offset circuit segments from each other, for reasons hereinafter discussed.

The circuit plate is then encapsulated in a plastic body by conventional injection molding techniques. The encapsulating material may be any one of a plurality of dielectric plastics having suitable temperature and electrical resistance capabilities. The plastic body forms the assembly housing.

Once the molding is completed, the housing, with encapsulated circuitry and terminals, is subjected to a final manufacturing step. A plurality of circuit bridges are punched out of the metal circuit plate. Four separate circuit strips remain in the housing, each connected to one of four terminals. The entire assembly is in one piece.

BRIEF DESCRIPTION OF THE DRAWINGS

The invention, including its construction and method of manufacture, is illustrated more or less diagrammatically in the drawings, in which.

DESCRIPTION OF THE PREFERRED EMBODIMENTS

Figure 1:
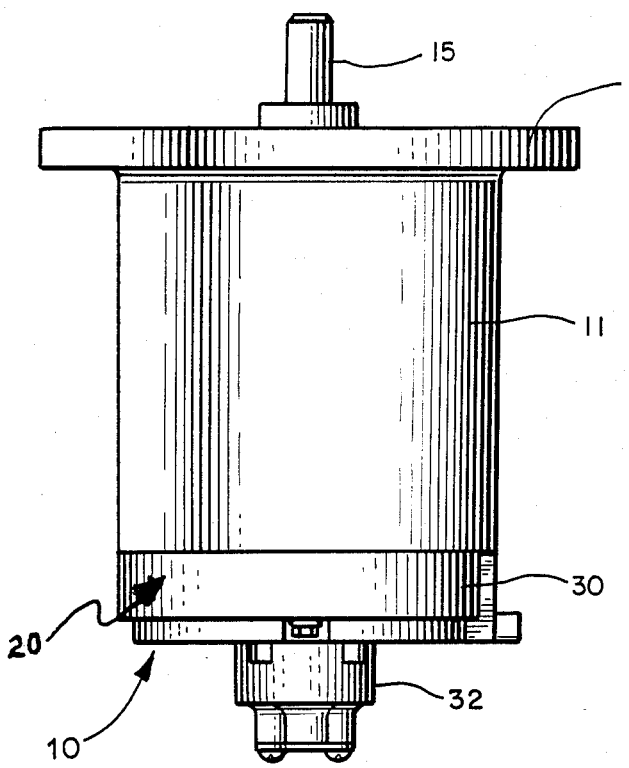
FIG. 1 is a side elevational view of an electric motor incorporating a brush holder assembly embodying features of the present invention.
Figure 2:
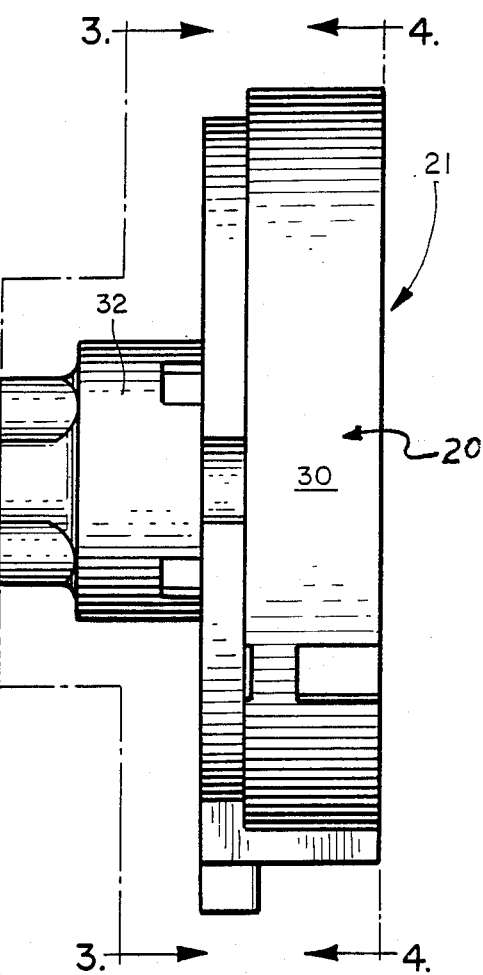
FIG. 2 is an enlarged, side elevational view of the brush holder incorporation, prior to assembly into the electric motor illustrated in FIG. 1.

Referring to the drawings, and particularly to FIG. 1, a small electric motor is illustrated generally at 10. The motor 10 includes a generally cylindrical housing 11 secured to a mounting plate 12. The housing 11 contains a four pole, permanent magnet stator of generally conventional construction.

Journaled within the housing and the stator is a shaft 15 on which a conventional armature rotor (not shown) is mounted. Also mounted on the shaft 15, and rotatable with it, is a conventional commutator (not shown). The shaft 15 extends out of the housing 11 through the plate 12. The commutator is mounted on the shaft 15, in the housing 11, inside a commutator brush holder assembly 20.

Referring now to FIGS. 2-6, the brush holder assembly 20 is shown removed from the housing 11. It comprises a molded plastic brush holder housing 21 in which is encapsulated four brush holder assembly circuits 22, 23, 24 and 25. The circuits 22-25 are all formed from a single metal circuit plate, in a manner hereinafter discussed, and are separated into individual circuits after being encapsulated in the housing 21 by injection molding.

The housing 21 includes a cylindrical skirt 30 which encircles a generally flat web 31. Formed concentrically of the skirt 30, in the center of the web 31, is a hub 32, which extends from the web 31 in the opposite direction from the skirt 30. All of these components are fabricated unitarily of plastic during the injection molding process. The hub 32 has a bearing passage 35 formed through it, concentric with the hub. The shaft 15 of the motor 10 is seated on a suitable bearing in the passage 35 when the motor is assembled.

Figure 3:
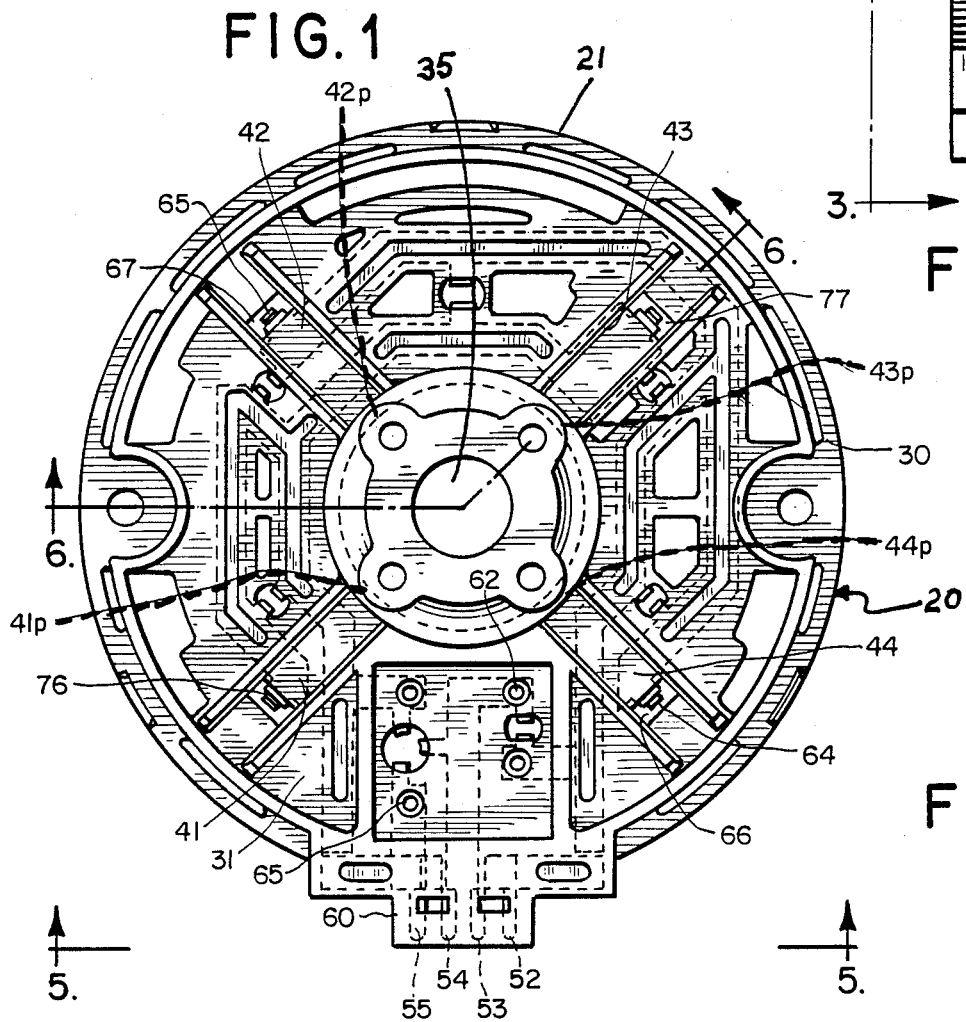
FIG. 3 is an end view of the brush holder assembly taken along line 3—3 of FIG. 2.

Formed on the outer face of the web 31, the same face on which the hub 32 is formed, as seen in FIG. 3, are four brush holder channels 41, 42, 43 and 44. Each of these channels 41-44 is in alignment with a corresponding port or hub port 41p, 42p, 43p and 44p formed radially through the hub 32. It will thus be seen that commutator brushes (not shown), which take the form of square, cross-sectioned blocks of carbon, can be mounted in the channels 41-44 in such a manner that their contact ends protrude through corresponding ports 41p-44p. In this manner, the brushes will extend into engagement with the commutator (not shown) on the shaft 15 within the commutator brush holder assembly 20.

Figure 4:
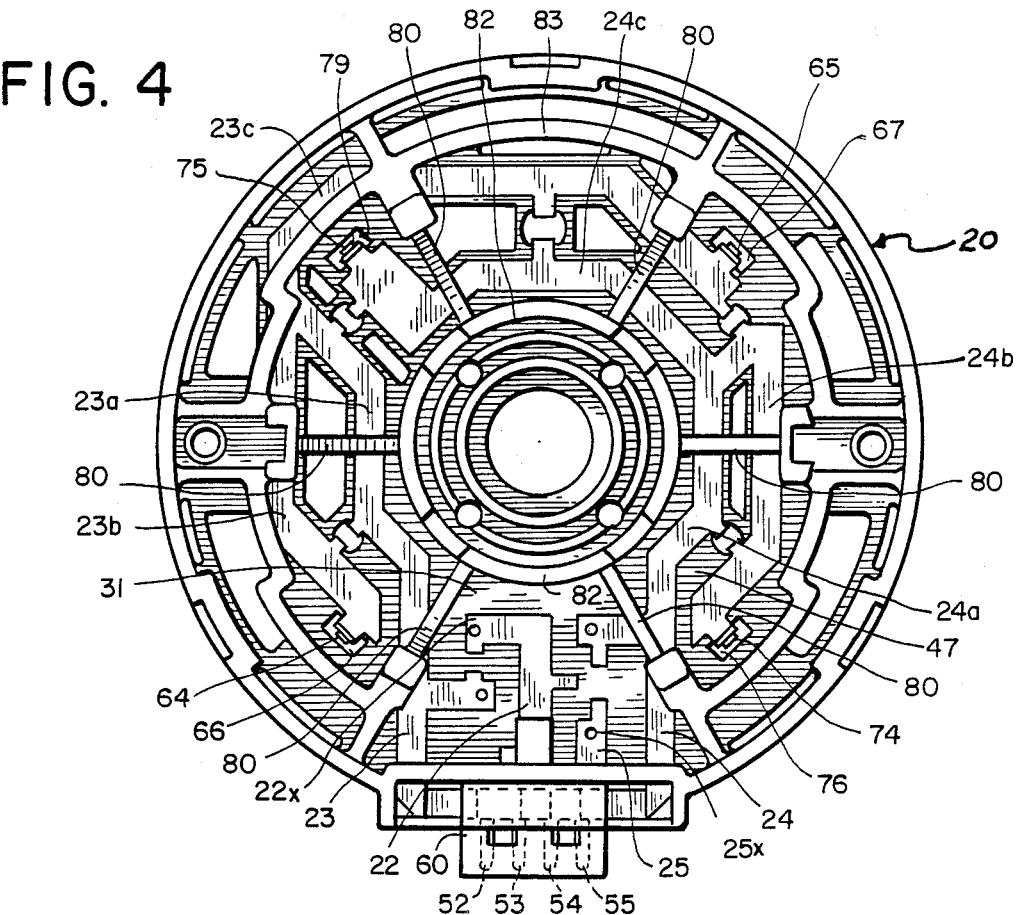
FIG. 4 is an end view of the brush holder assembly taken along line 4—4 of FIG. 2.
Figure 5:
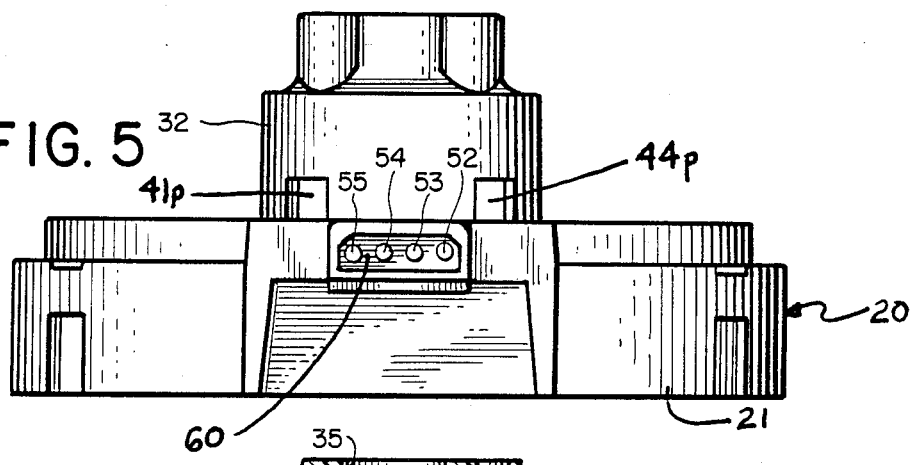
FIG. 5 is a side elevational view of the brush holder assembly taken along line 5—5 of FIG. 3.
Figure 6:
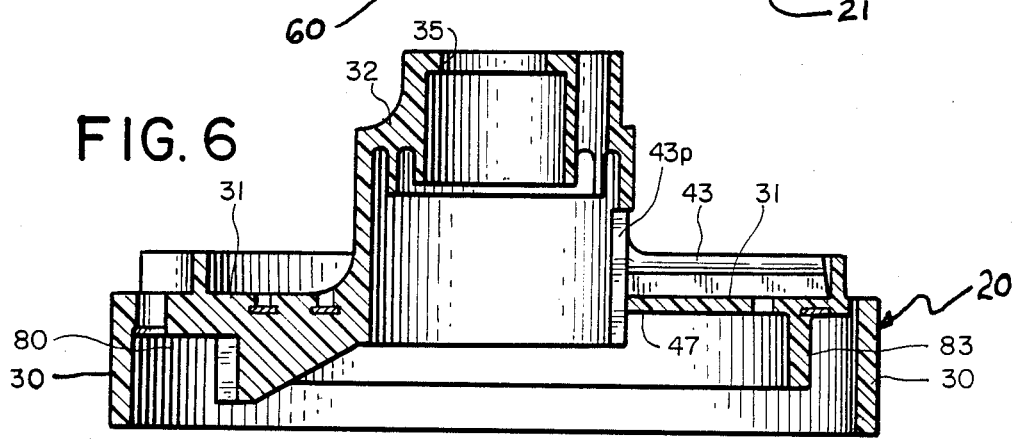
FIG. 6 is a sectional view taken along line 6—6 of FIG. 3.

Viewing the web 31 from the side opposite the hub 32, as seen in FIGS. 4 and 6, the circuits 22-25 are embedded in the inner face 47 of the web. The circuits 22-25 terminate in barrel terminals 52-55, respectively, as best seen in FIGS. 3 and 4. The barrel terminals 52-55 are embedded in a molded socket 60 of the housing body extending radially outwardly from the skirt 30.

Two of the circuits, circuits 22 and 25, comprise relatively short metal strips having only a single branch. As best seen in FIG. 4, they terminate relatively close to the socket 60. At the free end of the circuit 25, a connector attachment aperture 25x is formed. Similarly, at the free end of the circuit 22, a connector attachment aperture 22x is formed. These apertures 22x and 25x are formed in alignment with ports 62 and 65 formed in the plastic web 31 (see FIG. 3), thus permitting a circuit connection to be made through the web to the circuits 22 and 25, from the opposite side of the web.

The circuits 23 and 24 are considerably longer and, in addition, each has two branches. Referring to FIG. 4, the circuit 23 includes a stem strip 23a which extends across the face 47 of the web 31 to where it splits into two branch strips, 23b and 23c. The branch strip 23b extends to and terminates in a brush connector tab 64. The branch strip 23c extends to and terminates in a brush connector tab 65.

The tabs 64 and 65 are displaced 180 degrees from each other around the circumference of the web 31. The tab 64 is also disposed in alignment with the brush holder channel 44 while the tab 65 is in alignment with the brush holder channel 42, on the opposite side of the web 31. Ports or web ports 66 and 67 through the web 31 permit electrical connection between the tabs 64 and 65, respectively, and the brushes (not shown) which seat slideably in the channels 44 and 42.

The circuit 24 includes a stem strip 24a which extends across the face 47 of the web 31 opposite the hub 32 from the circuit strip 23, and splits into two branch strips 24b and 24c. The branch strip 24b terminates in a brush connector tab 74 and the branch strip 24c terminates in a brush connector tab 75. The brush tabs 74 and 75 are in alignment with ports 76 and 77 through the web 31, permitting electrical connection with corresponding brushes (not shown) in the channels 41 and 43 on the opposite side of the web.

As has been pointed out, the circuits 22-25 are embedded in the face of the web 31 opposite the hub 32. They are locked in position by six struts 80 which radiate between a hub extension 82, opposite the web 31 from the hub 32, to an inner skirt 83 concentric with the cylindrical skirt 30 hereinbefore discussed. The struts 80 overlie corresponding circuits 22-25 and are formed during the molding process.

Now that the structure of the assembly 20 has been described, a description of the method by which it is fabricated is in order. The fabrication method also embodies features of the invention.

Figure 8:
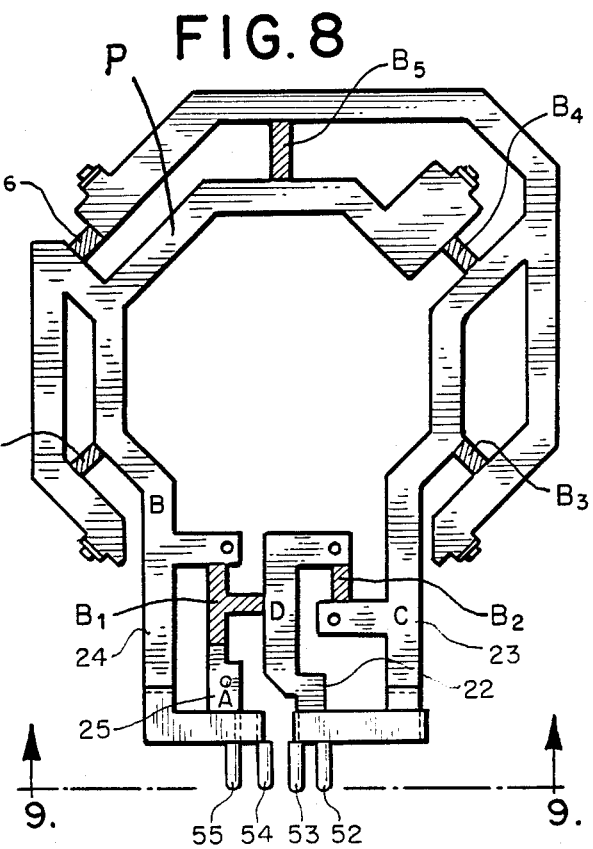
FIG. 8 is a bottom plan view of the plate illustrated in FIG. 7.
Figure 7:
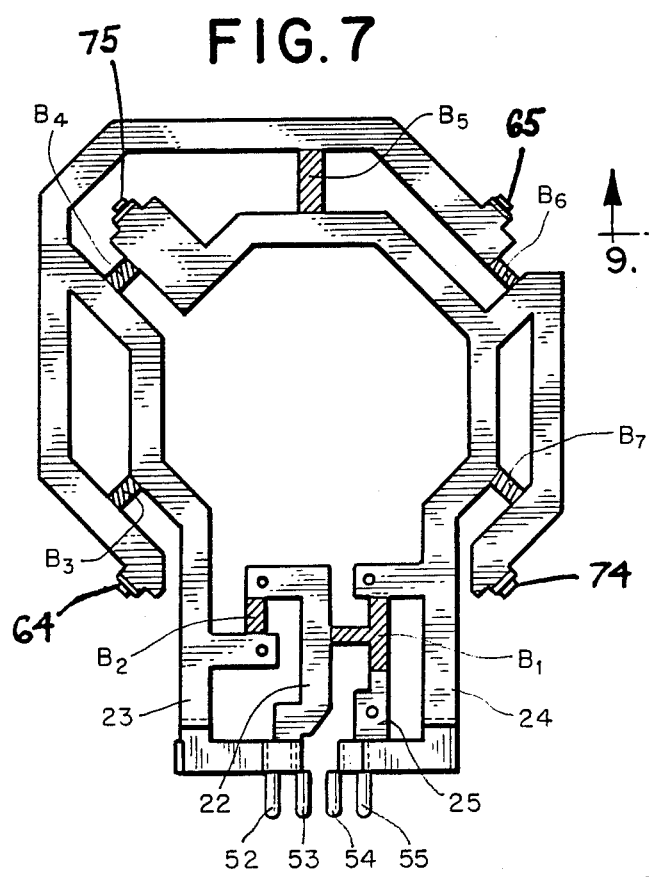
FIG. 7 is a top plan view of one side of the stamped and formed circuit plate for the brush holder assembly of the present invention.
Figure 9:
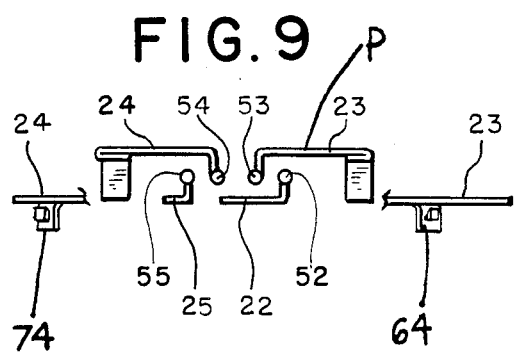
FIG. 9 is an end view of the plate, taken along line 9—9 of FIG. 8.

The fabrication method comprises a first step of stamping and forming the circuit plate P, illustrated in FIGS. 7-9, from 0.015+0.001 inch thick, pre-tinned brass sheet stock. The stamping and forming process, which is accomplished with conventional techniques, cuts and forms the plate P in one piece. As such, it includes the circuits 22-25 and the connector barrel terminals 52-55.

Bridging the circuits 22-25 in the plate P, however, are plate bridges $B_1$, $B_2$, $B_3$, $B_4$, $B_5$, $B_6$, and $B_7$. These plate bridges $B_1$-$B_7$ serve to unitize the plate P prior to the final step in the fabrication method which, as we shall subsequently see, involves removing them.

The plate P is formed so that the connector barrel terminals 52-55, which terminate the circuits 22-25, are aligned with each other in a single plane offset from the plane of the circuits. As best seen in FIG. 9, the plate P is formed so that non-interfering circuits strip paths are created between the terminals 52-55 and the circuits 22-25.

As seen in FIG. 9, the plate P is also formed so that the tabs (64 and 74 are shown) are bent out of the plane of the strips 22-25 perpendicular to it. As such, when the plate P is encapsulated in the manner hereinbefore discussed, the tabs extend perpendicular to the web 31 and in alignment with corresponding ports 66, 67, 76 and 77 in the web (see FIG. 3) to permit the electrical connections hereinbefore discussed.

The second step of the method involves injection molding a matrix of a dielectric plastic material around the plate P, so as to encapsulate it in the manner hereinbefore discussed. This is accomplished using conventional injection molding techniques. The product of this step is a unitary mating of a plate P encapsulated in a plastic body.

The third step of the method embodying the invention involves punching the bridges $B_1$-$B_7$, out of the encapsulated plate P. This is accomplished by seating the encapsulated plate P in a jig and punching through the plastic matrix at prescribed locations. To facilitate this punching operation, the plastic matrix is molded so that only a very thin plastic membrane is formed at those locations in registry with the bridges $B_1$-$B_7$.

While the process and product embodiments described herein are at present considered to be preferred, it is understood that various modifications and improvements may be made therein, and it is intended to cover in the appended claims all such modifications and improvements as fall within the true spirit and scope of the invention.

I claim:

1. A brush holder assembly for an electric motor, comprising:

(a) a brush holder housing unitarily molded of plastic material;
(b) said housing including a centrally disposed hub, a web radially extending from said hub, and a skirt extending around said web and concentric with said hub;
(c) a baring passage formed through said hub perpendicular to said web;
(d) said web having an inner face and an outer face;
(e) a plurality of brush holder channels formed unitarily with said web on said outer face and radiating from said web;
(f) each of said channels communicating with a hub port extending radially through said hub;
(g) a plurality of metal strips defining circuits embedded in said web so as to be substantially exposed only on said inner face; and
(9') a web port extending through said web into each of said channels;
(h) each of said circuits having a connector terminal formed unitarily therewith and extending radially outwardly through said skirt;
(i) at least one of said circuits including brush connector means in alignment with one of said web ports extending through said web to permit electrical connection in one of said channels;
(j) at least one said metal strips defining said at least one circuit comprising said one of said circuits between one said connector terminals and at least one of said channels.

2. The brush holder assembly of claim 1 further characterized in that:
(a) there are four of said circuits embedded in said web;
(b) two of said circuits having one branch each and two of said circuits having two branches each;
(c) each branch of said circuits which have two branches terminating in a brush connector tab;
(d) each one of said tabs extending perpendicular to said web and in alignment with one of said web ports formed through said web to permit an electrical connection being made in each one of said channels.

3. The brush holder assembly of claim 2 further characterized in that:
(a) said metal strips define said circuits which lie substantially in a plane on said inner face; and
(b) said connector terminals are formed in portions of said metal strips offset from said plane whereby said terminals lie in another plane offset from said plane.

* * * * *

UNITED STATES PATENT AND TRADEMARK OFFICE
CERTIFICATE OF CORRECTION

PATENT NO.   :   4,845,396
DATED        :   July 4, 1989
INVENTOR(S)  :   Duane J. Huber It is certified that error appears in the above-identified patent and that said Letters Patent is hereby corrected as shown below:

Column 4, line 17, "+" should read -- $\pm$ --.

Column 4, line 32, delete "circuits strip".

Signed and Sealed this

Second Day of January, 1990

Attest:

JEFFREY M. SAMUELS

Attesting Officer    Acting Commissioner of Patents and Trademarks